United States Patent
Ishihara et al.

(10) Patent No.: US 6,676,556 B2
(45) Date of Patent: Jan. 13, 2004

(54) MOTOR DEVICE FOR ACTUATING VEHICLE DOOR OPERATION DEVICE

(75) Inventors: Hiroshi Ishihara, Anjo (JP); Saburou Suzuki, Tokoname (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/079,573

(22) Filed: Feb. 22, 2002

(65) Prior Publication Data
US 2002/0119861 A1 Aug. 29, 2002

(30) Foreign Application Priority Data
Feb. 23, 2001 (JP) ........................................ 2001-047616

(51) Int. Cl.[7] .............................. F16H 3/44; E05C 3/06
(52) U.S. Cl. ...................................... 475/269; 292/199
(58) Field of Search .............................. 292/197, 201; 475/269, 270, 317, 302, 4; 74/411.5

(56) References Cited

U.S. PATENT DOCUMENTS

| | | | | |
|---|---|---|---|---|
| 5,447,477 A | * | 9/1995 | Bresson et al. | 475/269 X |
| 5,639,130 A | * | 6/1997 | Rogers, Jr. et al. | 292/216 |
| 5,873,622 A | * | 2/1999 | Kluting et al. | 196/146.11 |
| 5,997,055 A | * | 12/1999 | Strathmann | 292/201 |
| 6,116,103 A | * | 9/2000 | Heckel, Jr. | 74/411.5 X |
| 2002/0000725 A1 | * | 1/2002 | Ostrowski et al. | 292/199 |

FOREIGN PATENT DOCUMENTS

JP 11-303483 A 11/1999

* cited by examiner

Primary Examiner—Roger Pang
(74) Attorney, Agent, or Firm—Burns, Doane, Swecker & Mathis, LLP

(57) ABSTRACT

A motor deice for actuating a vehicle door operation device is operated by the rotational torque inputted from a electric motor to operate a latch mechanism. The rotational torque of the motor is inputted to a sun gear body of a planetary gear mechanism to rotate each of several planetary gears via a ring gear body fixed against rotation. A carrier is rotated by the rotation of the planetary gears and an output shaft operates the latch operation mechanism. The ring gear body is fixed against rotation by engaging an engagement-disengagement block with an outer gear portion through application of a force of a spring. By applying the opening operation to a door handle, an engagement-disengagement operation member is rotated to retract the engagement-disengagement block. Then, the ring gear body is released to be rotated to interrupt a power transmission condition between the motor and the output shaft.

13 Claims, 5 Drawing Sheets

1

MOTOR DEVICE FOR ACTUATING VEHICLE DOOR OPERATION DEVICE

This application is based on and claims priority under 35 U.S.C. §119 with respect to Japanese Application No. 2001-047616 filed on Feb. 23, 2001, the entire content of which is incorporated herein by reference.

FIELD OF THE INVENTION

This invention generally relates to a motor device for effecting vehicle operation. More particularly, the present invention pertains to a motor device/door closer for actuating a vehicle door operation device for opening and closing a door by operating a latch mechanism for latching the vehicle door by the driving force of a motor device.

BACKGROUND OF THE INVENTION

An example of a known vehicle door closer device is disclosed in Japanese Patent Laid-Open Publication No. H11-303483. Referring to FIG. 7, this known door closer device includes a passive lever 75 supported by an active lever 74 of a link mechanism 73 and operatively rotated by rotating the active lever 74 by a motor device 72. The motor device 72 includes a motor 70 and a reduction gear device 71. The passive lever 75 rotates a latch 77 of a latch mechanism 76 from a half latched position to a fully latched position. Thus, the half latched door is fully latched by the door closer device. In this case, a cancel lever 78 supported by a base plate along with the active lever 74 contacts the passive lever 75 to restrict the rotation of the passive lever 75 relative to the active lever 74 and thus to rotate the passive lever 75 along with the active lever 74.

On the other hand, in case the outside door handle is operated for the opening operation during the closing operation of the door closer, as shown in FIG. 8, a connecting lever 79 coaxially supported by the cancel lever 78 is rotated to retract the cancel lever 78 from the condition in which the cancel lever 78 restricts the rotation of the passive lever 75. In this situation, the rotation of the passive lever 75 relative to the active lever 74 is not restricted by the cancel lever 78, and the rotation of the active lever 74 is in an inactive condition. Simultaneously, a pawl 80 of the latch mechanism 76 is retracted by the rotation of the connecting lever 79 to unlatch the latch mechanism 76. Accordingly, the door can be manually opened even if the door closer device is under the closing operation.

With the construction of this known vehicle door closer device, the passive lever 75, the cancel lever 78, and the connecting lever 79 have to be provided in addition to the active lever 74 for opening the door during the closing operation of the door closer. Thus, the construction of the link mechanism 73 for operating the latch mechanism 76 by the operation of the motor device 72 is relatively complex.

A need thus exists for a motor device for actuating a vehicle door operation device/door closer device which has a more simple construction of the latch operation mechanism for operating the latch mechanism operated by the rotational torque inputted from an electric motor.

SUMMARY OF THE INVENTION

A motor device for actuating a vehicle door operation device includes an output shaft body for outputting a rotational torque of an electric motor, a power transmitting mechanism for transmitting the rotational torque from the electric motor to the output shaft body, and a connection interrupting means for interrupting a power transmission condition between the electric motor and the output shaft body.

According to another aspect, a motor device for actuating a vehicle door operation device includes an output shaft body for outputting a rotational torque of an electric motor, a power transmitting mechanism for transmitting the rotational torque from the electric motor to the output shaft body, connection interrupting means for interrupting a power transmission condition between the electric motor and the output shaft body, a latch mechanism for maintaining the vehicle door at a half open condition or at fully closed condition, and a latch operation mechanism engaged with the latch mechanism for fully closing the half open vehicle door. The motor device transmits the driving force to the latch operation mechanism for operating the latch mechanism for fully closing the half open vehicle door.

According to another aspect, a device for actuating vehicle door operation device includes a motor which produces rotational torque, an output shaft operatively connected to a latch operation mechanism for effecting operation of a latch, a plurality of gears forming a planetary gear mechanism that is operatively associated with the motor for transmitting the rotational torque produced by the motor to the output shaft, and an engagement-disengagement block movable into engagement with one of the gears forming a part of the planetary gear mechanism to fix the one gear against rotation whereupon the rotational torque of the motor is transmitted to the output shaft to operation the latch operation mechanism and movable out of engagement with the one gear forming a part of the planetary gear mechanism to permit rotation of the one gear whereupon the rotational torque of the motor is not transmitted to the output shaft.

BRIEF DESCRIPTION OF THE DRAWINGS FIGURES

The foregoing and additional features and characteristics of the present invention will become more apparent from the following detailed description considered reference to the accompanying drawing figures in which like reference numerals designate like elements.

DETAILED DESCRIPTION OF THE INVENTION

An embodiment of a motor device for actuating a vehicle door closer device in accordance with the disclosure herein is explained below with reference to FIGS. 1–6. A vehicle door closer device described as an example of a vehicle door operation device is constructed with a motor device 10, a known latch mechanism and a latch operation mechanism actuated by the motor device 10 which outputs rotational torque. The latch mechanism maintains the vehicle door at a half latched position or condition and at fully latched position or condition. The latch operation mechanism converts or transfers the rotational torque outputted from the motor device 10 to, for example, the rotation of a lever. By switching the latch of the latch mechanism from the half latched condition to the fully latched condition through rotation of the lever, the vehicle door is fully closed.

Figure 2:
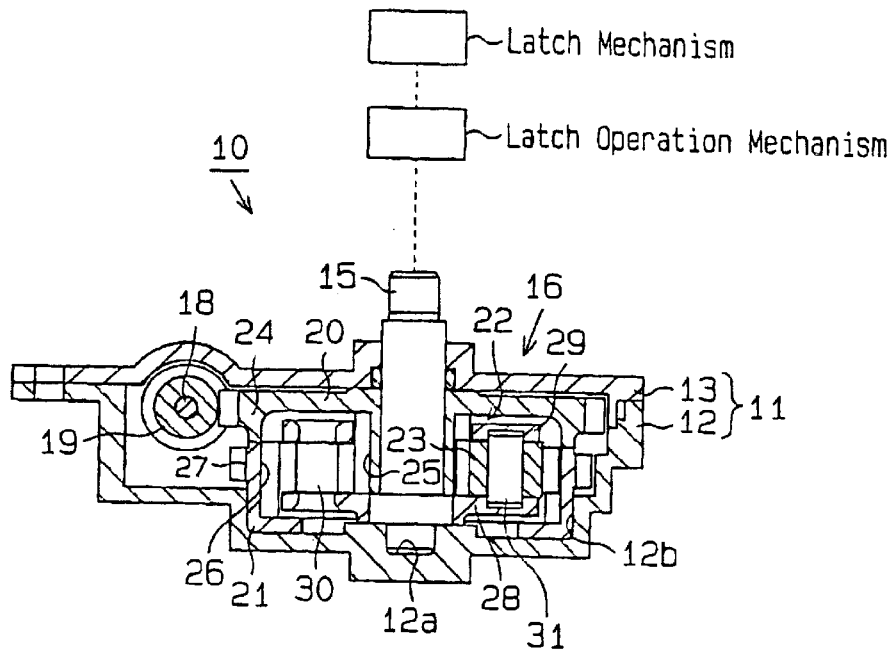
FIG. 2 is a cross-sectional view of the motor device of the door closer device shown in FIG. 1, including an illustration of the output shaft of the motor device.
Figure 3:
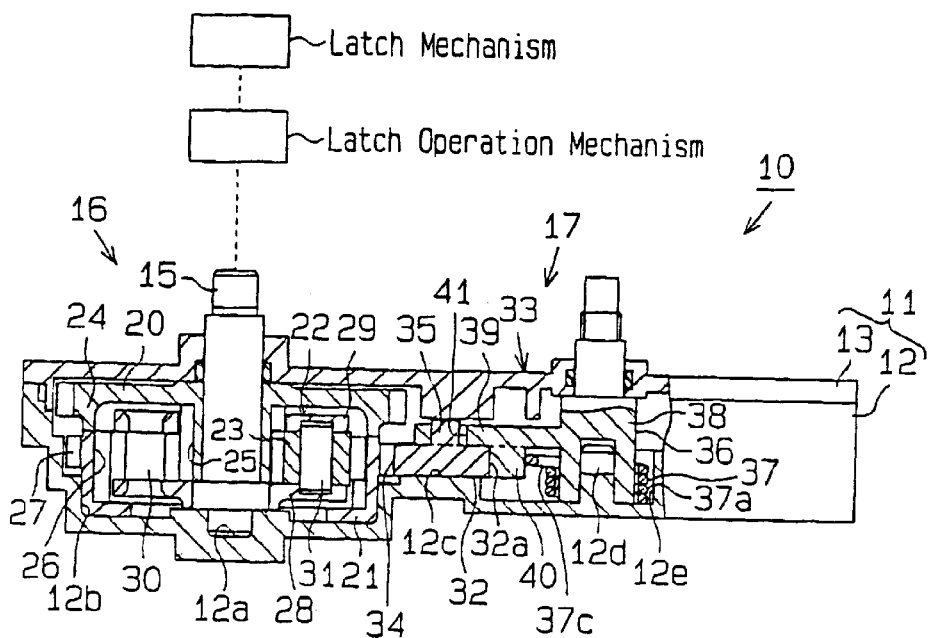
FIG. 3 is a cross-sectional view of the motor device of the door closer device shown in FIG. 1, including an illustration of the output shaft and a shaft body of the motor device.
Figure 4:
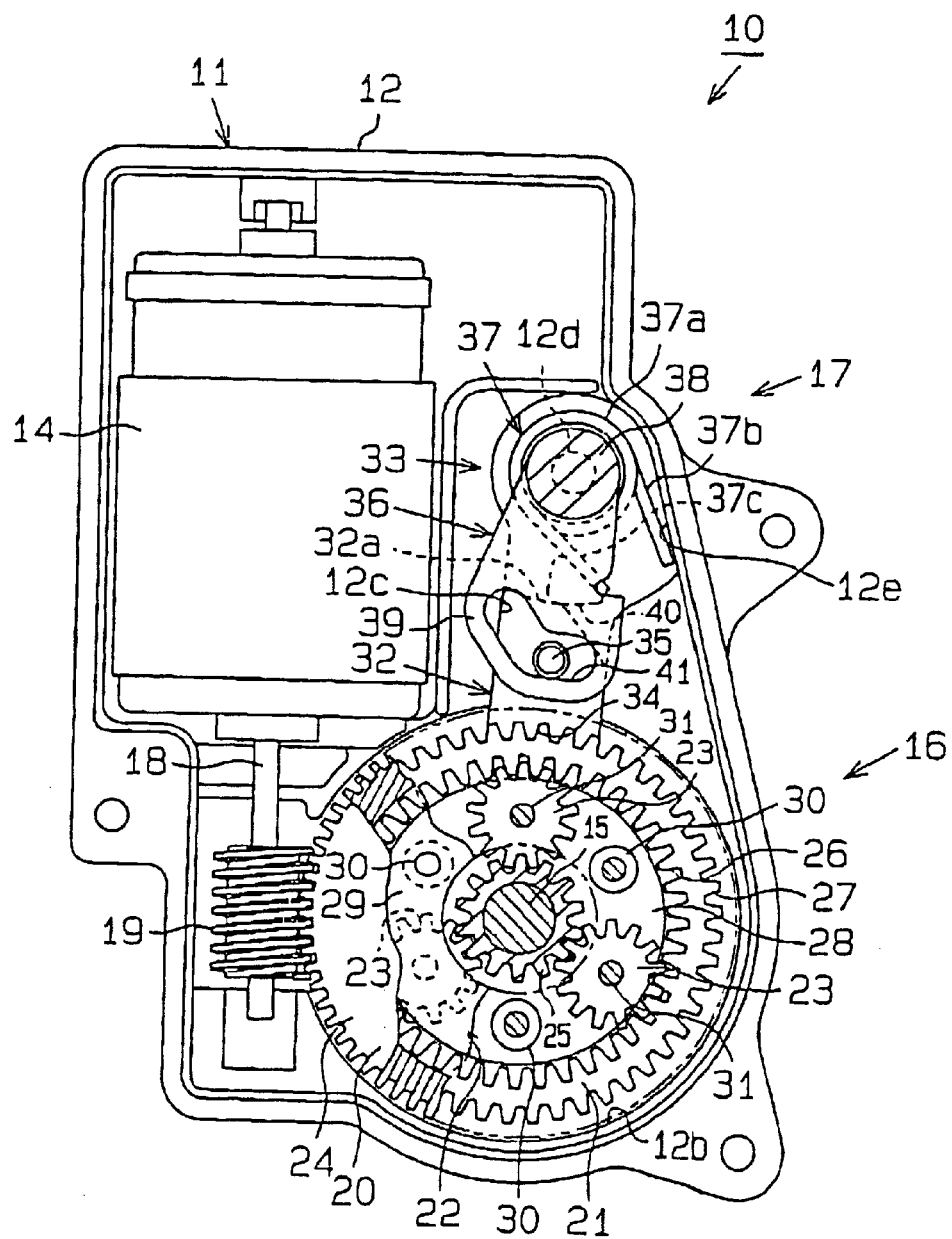
FIG. 4 is a plane view of the motor device of a door closer device.

As shown in FIGS. 2–4, the motor device 10 includes a housing 11 having a base portion 12 and a lid portion 13. The housing 11 accommodates an electric motor 14 (referred to as a motor hereinafter), an output shaft 15 serving as an output shaft body, a planetary gear mechanism 16 serving as a power transmitting mechanism, and a connection interrupting mechanism 17 serving as a connection interrupting means.

The motor 14 is provided with a rotation shaft 18 for outputting rotational torque. A worm 19 is fixed to the rotational shaft 18. The motor 14 is controlled by a door controller to actuate or rotate the rotational shaft 18 in a normal direction and in a reverse direction.

Figure 6:
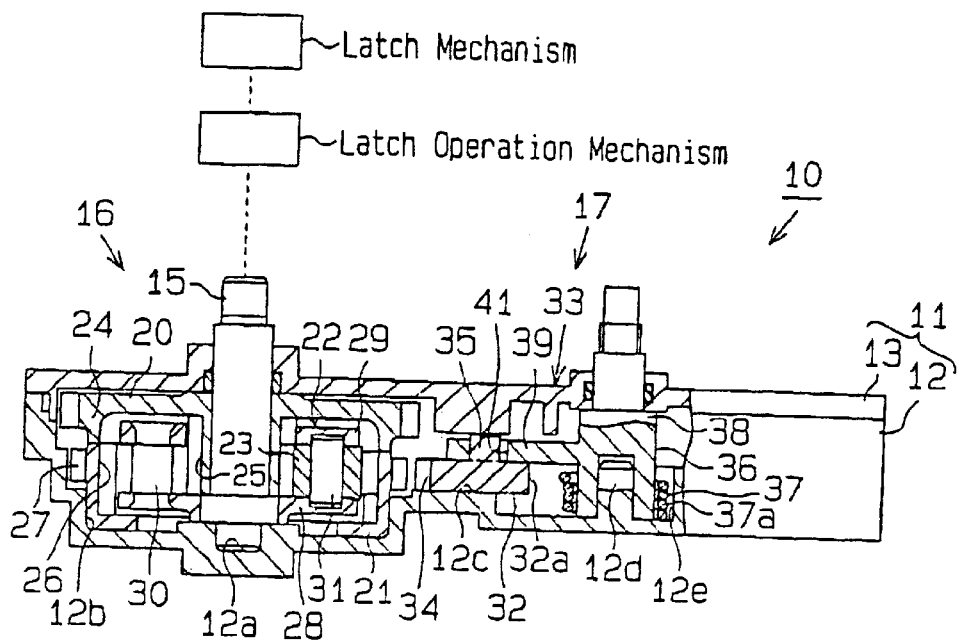
FIG. 6 is a longitudinal cross-sectional view of a motor device of a door closer device, including an illustration of the output shaft and the shaft body of the motor device.
Figure 7:
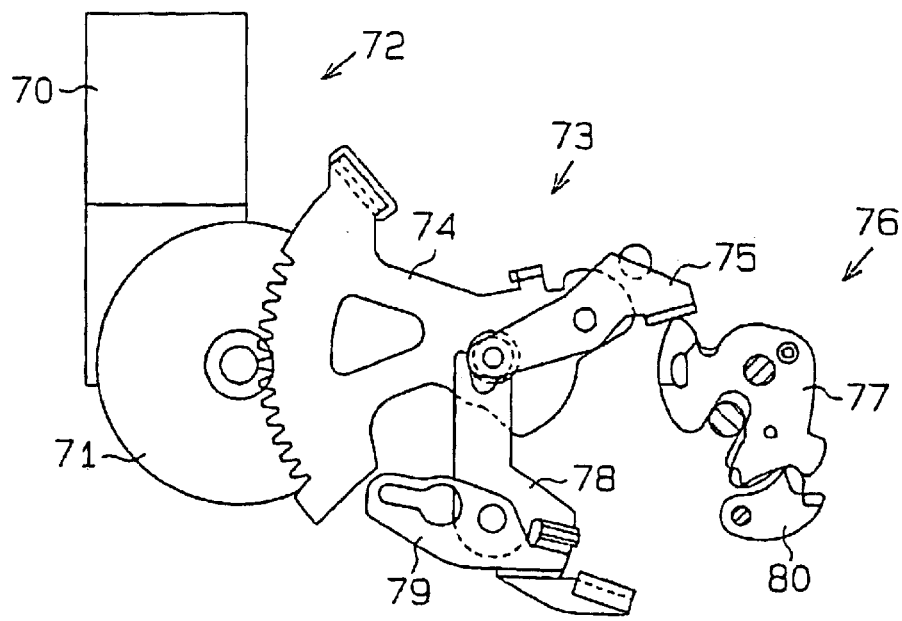
FIG. 7 is a side view of a known link mechanism of a door closer device.
Figure 8:
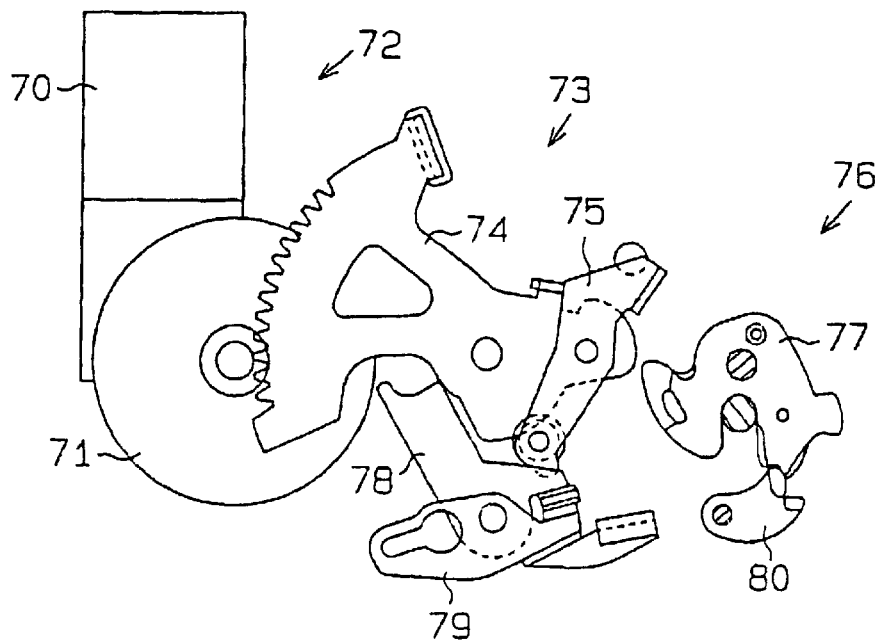
FIG. 8 is a front view of the known link mechanism of the door closer device in a different position from that shown in FIG. 7.

The output shaft 15 is rotatably supported by a recessed portion 12a provided on the base portion 12 and a bore provided in the lid portion 13. One end of the output shaft 15 extends outside of the housing 11. The output shaft 15 transmits the driving force to the input side of the latch operation mechanism as schematically shown in FIGS. 2, 3 and 6.

The planetary gear mechanism 16 corresponding to the reduction gear mechanism includes a sun gear body 20 as a sun gear, a ring gear body 21 as a ring gear and a fixed element, a carrier 22 serving as an output element, and three planetary gears 23.

The sun gear body 20 which is pivoted by the output shaft 15 includes a worm wheel portion 24 and a sun gear portion 25. The worm wheel portion 24 is engaged with the worm 19 that is fixed to the rotational shaft 18 of the motor 14 while rotating on the output shaft 15 which is also the axis of the worm wheel portion 24. The worm wheel portion 24 and the worm 19 form a worm gear for decelerating the rotational torque outputted from the motor 14 via the rotational shaft 18 for transmission to the sun gear portion 25. The sun gear portion 25 rotates on the output shaft 15 along with the worm wheel gear 24.

The ring gear body 21 includes an inner gear portion 26 and an outer gear portion 27, and is rotatably supported in a recessed portion 12b formed in the base portion 12. The inner gear portion 26 of the ring gear body is formed on and extends along the entire periphery of the inner peripheral surface of the ring gear body. The outer gear portion 27 serving as an engagement portion and a geared engagement portion is formed on and extends along the entire periphery of the outer peripheral surface of the ring gear body.

The carrier 22 includes an annular support plate 28, an annular connection plate 29, three connecting shafts 30, and three support shafts 31. The annular support plate 28 is positioned in the recessed portion 12b and is fixed to the output shaft 15. The annular connection plate 29 is fixedly connected to the support plate 28 by the three connecting shafts 30. The three support shafts 31 are supported between the support plate 28 and the connection plate 29.

Each planetary gear 23 is rotatably mounted on a respective one of the support shafts 31 of the carrier 22. Each planetary gear 23 rotates on the corresponding support shaft 31 while rotating around the output shaft 15 in accordance with the rotation of the carrier 22. Each planetary gear 23 is also geared with the sun gear portion 25 of the sun gear body 20 and the inner gear portion 26 of the ring gear body 21.

The planetary gear mechanism 16 constructed in the foregoing manner drives each planetary gear 23 by virtue of the rotational torque inputted from the motor 14 to the sun gear 20. The planetary gears 23 geared or engaged with the ring gear body 21 are able to rotate or move around the output shaft 15 when the ring gear body 21 is fixed against rotation by the connection interrupting mechanism 17. This causes the carrier 22 supporting the planetary gears 23 to rotate and so the decelerated rotational torque is outputted from the output shaft 15.

The connection interrupting mechanism 17 transmits the driving force between the sun gear body 20 and the output shaft 15 of the planetary gear mechanism 16 when a door handle, such as the inside handle in the vehicle compartment and the outside handle on the outside of the vehicle, is not operated to open the door. When the door handle is operated to open the door, the connection interrupting mechanism 17 interrupts the power transmitting condition between the sun gear 20 and the output shaft 15. The connection interrupting mechanism 17 releases the power transmitting condition from the motor 14 to the latch mechanism via the link mechanism.

As shown in FIGS. 3–4, the connection interrupting mechanism 17 includes the outer gear portion 27 provided on the outer peripheral surface of the ring gear body 21, an engagement-disengagement block or member 32 provided at the outer periphery of the ring gear body 21, and an engagement operation mechanism 33 for operating the engagement-disengagement block 32 upon the opening operation of the door handle.

A part of the outer gear portion 27 of the ring gear body 21 faces one end of a groove 12c provided on the base portion 12 and extending outward of the ring gear body 21 in an approximately radial direction relative to the rotational axis of the ring gear body 21.

Figures 5A, 5B, 5C:
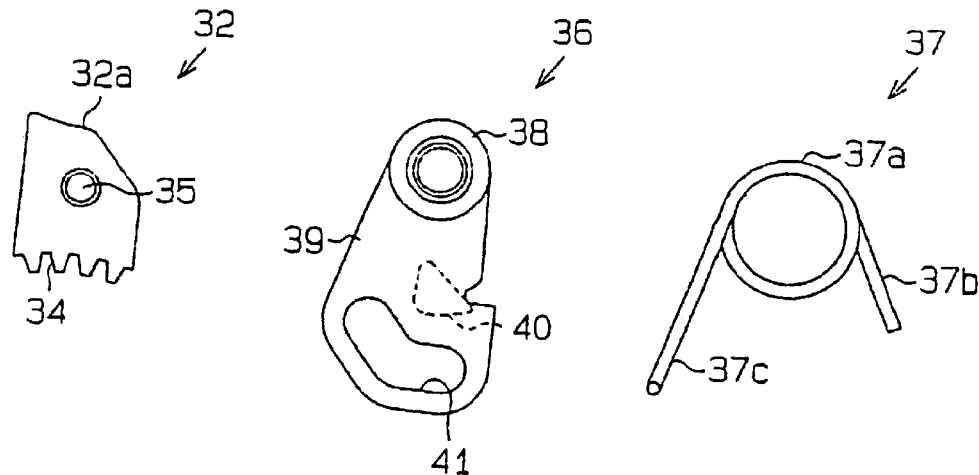
FIG. 5(a) is a plane view of an engagement-disengagement block used in the motor device.
FIG. 5(b) is a plane view of an engagement-disengagement operation member used in the motor device.
FIG. 5(c) is a plane view of a torsion coil spring used in the motor device.

As shown in FIG. 5(a), the engagement-disengagement block 32 includes a tooth-shaped engagement portion 34 at one end that is engageable with the outer gear portion 27 of the ring gear body 21 and a contacting surface 32a on the other end. A pin-shaped engagement portion 35 is provided on the engagement-disengagement block 32 and extends upwardly as shown in FIG. 3. The engagement-disengagement block 32 is accommodated in the groove 12c of the base portion 12 to be movable in an approximately radial direction relative to the rotation axis of the ring gear body 21. The engagement-disengagement block 32 is movable between a position where the tooth-shaped engagement portion 34 engages the outer gear portion 27 of the ring gear body 21 and a position where the tooth-shaped engagement portion 34 is disengaged from the outer gear portion 27 of the ring gear body 21. The engagement-disengagement block 32 fixes the ring gear body 21 against rotation (i.e., the ring gear body is non-rotatable) when the tooth-shaped engagement portion 34 is engaged with the outer gear portion 27 and releases the ring gear body 21 to permit rotation of the ring gear body 21 when the tooth-shaped engagement portion 34 is disengaged from the outer gear portion 27.

As shown in FIGS. 3 and 4, the engagement operation mechanism 33 includes an engagement-disengagement operation member 36 and a torsion coil spring 37. The engagement operation mechanism 33 is adapted to maintain the engagement-disengagement block 32 at a position where the tooth-shaped engagement portion 34 is geared with the outer gear portion 27 of the ring gear body 21 and to retract the engagement block 32 to disengage the tooth-shaped engagement portion 34 from the outer gear portion 27 upon opening operation of the door handle. The engagement-disengagement operation member 36 and the torsion coil spring 37 together form an engagement operation means. Also, the outer gear portion 27, the engagement-disengagement block 32, and the engagement operation mechanism 33 together form a connection interrupting means.

As shown in FIG. 5(b), the engagement-disengagement operation member 36 includes a shaft portion 38 and a cam portion (cam member) 39 which are integrally formed together as one unit. Referring to FIGS. 3 and 4, the shaft portion 38 is rotatably supported by a projecting portion 12d provided on the base portion 12. The shaft portion 38 is rotated in the counterclockwise direction of FIG. 4 by the opening operation of the door handle to rotate the cam portion 39.

Figure 1:
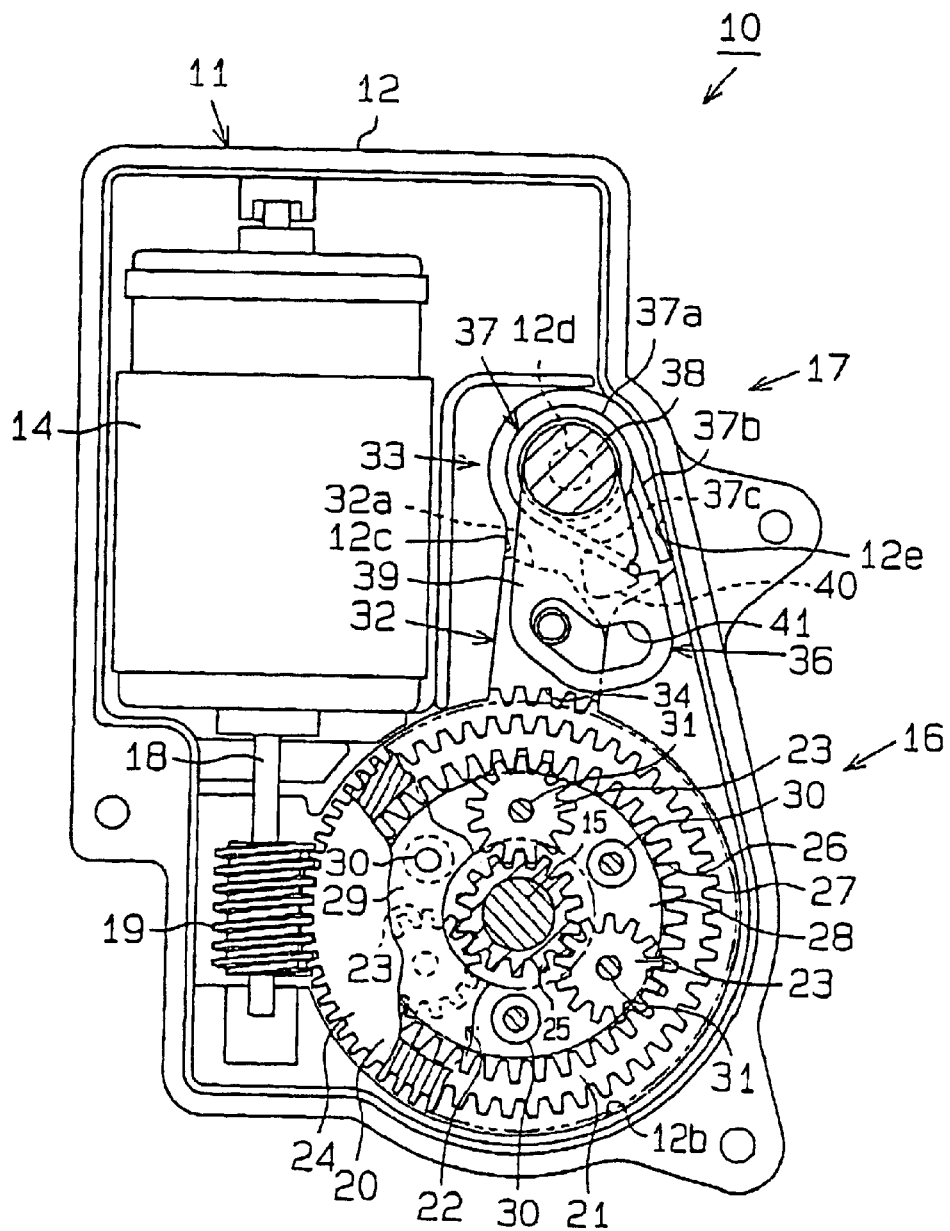
FIG. 1 is a plane view of a motor device of a door closer device according to one embodiment.

As shown in FIG. 5(b), the cam portion 39 includes a convex or projecting engagement portion 40 for contacting the contacting surface 32a of the engagement-disengagement block 32. The cam portion 39 also includes a cam bore 41 in the form of an arcuate slot in which is positioned the pin-shaped engagement portion 35 of the engagement-disengagement block 32. As shown in FIGS. 3 and 4, the cam portion 39 positions the engagement-disengagement block 32 so that the tooth-shaped engagement portion 34 of the engagement-disengagement block 32 engages the outer gear portion 27 of the ring gear body 21 by virtue of the contacting engagement of the projecting engagement portion 40 with the contacting surface 32a of the engagement-disengagement block 32. Thus, the tooth-shaped engagement portion 34 is engaged with the outer gear portion 27. On the other hand, as shown in FIGS. 1 and 6, the cam portion 39 retracts the engagement-disengagement block 32 from the position at which the tooth-shaped engagement portion 34 is engaged with the outer gear portion 27 of the ring gear body 21 by contacting the pin shaped engagement portion 35 of the engagement-disengagement block 23 to the inner peripheral surface of the cam bore 41. Thus, the tooth-shaped engagement portion 34 is disengaged from the outer gear portion 27.

As shown in FIG. 5(c), the torsion coil spring 37 includes a wound portion 37a, a fixed end 37b, and a free end 37c. The fixed end 37b and the free end 37c extend from the wound portion 37a. As shown in FIGS. 3 and 4, the wound portion 37a of the torsion coil spring 37 is pivoted about or positioned on the shaft portion 38, and the fixed end 37b contacts a recess portion 12e of the base portion 12. The torsion coil spring 37 biases the engagement-disengagement operation member 36 for rotating in the clockwise direction of FIG. 4 by virtue of the free end 37c of the torsion spring 37 contacting the projecting engagement portion 40 of the cam portion 39. The torsion coil spring 37 thus biases or urges the engagement-disengagement block 32 in the radial direction toward the ring gear body 21 by biasing the engagement-disengagement operation member 36. This thus maintains the tooth-shaped engagement portion 34 of the engagement-disengagement block 32 in engagement with the outer gear portion 27 of the ring gear body 21.

With the construction of the connection interrupting mechanism 17 described above and shown in the drawing figures, the engagement-disengagement block 32 is moved or urged in the radial direction by the biasing force of the torsion coil spring 37 via the engagement-disengagement operation member 36 when the opening operation of the door handle is not performed (i.e., when the door handle is not operated). In this case, the engagement-disengagement block 32 is maintained at the position in which the engagement portion 34 is engaged with the outer gear portion 27 of the ring gear body 21. On the other hand, the engagement-disengagement operation member 36 retracts the engagement-disengagement block 32 in the radial direction against the biasing force of the torsion coil spring 37 (i.e., moves the engagement-disengagement block 32 away from the outer gear portion 27 of the ring gear body 21) when the opening operation of the door handle is performed. In this way, the tooth shaped engagement portion 34 of the engagement-disengagement block 32 is moved to a position in which the tooth-shaped engagement portion 34 is disengaged from the outer gear portion 27 of the ring gear body 21.

Generally speaking, rotational torque of the motor 14 produced during operation of the motor is transmitted in the following manner. The operation of the motor 14 causes rotation of the shaft 18 and the worm 19. The worm 19 engages the worm wheel portion 24 of the sun gear body 20 which rotates relative to the shaft 15, thus causing the sun gear body 20 to rotate. The sun gear portion 25 of the sun gear body 20 thus also rotates. The rotation of the sun gear portion 25 causes rotation of each of the planetary gears 23 which each engage the inner gear portion 26 of the ring gear body 21. When the tooth-shaped engagement portion 34 of the engagement-disengagement block 32 is engaged with the outer gear portion 27 of the ring gear body 21, the ring gear body 21 is unable to rotate. Thus, the rotation of the sun gear portion 25 which is transferred to the planetary gears 23 causes the carrier 22 to rotate. The rotation of the carrier 22 causes the output shaft 15 to rotate by virtue of the support plate 28, forming a part of the carrier, being fixed to the output shaft 15. This effects operation of the latch operation mechanism.

On the other hand, when the tooth-shaped engagement portion 34 of the engagement-disengagement block 32 is out of engagement with the outer gear portion 27 of the ring gear body 21, the ring gear body 21 is free to rotate. As described above, the rotation of the sun gear portion 25 is transferred to the planetary gears 23 which engage the inner gear portion 26 of the ring gear body 21. Because the ring gear body 21 is no longer fixed against rotation, the rotation of the planetary gears 23 causes the ring gear body 21 to be rotated. Thus, rotation is not transferred to the output shaft 15.

The operation of the overall device is as follows. When the opening operation of the door handle is not performed, as shown in FIGS. 3 and 4, the engagement-disengagement block 32 is maintained at the position in which the tooth-shaped engagement portion 34 is engaged with the outer gear portion 27 of the ring gear body 21 by the biasing force of the torsion coil spring 37. Accordingly, the ring gear body 21 is fixed so as not to be rotatable and the driving force is transmitted between the motor 14 and the output shaft 15.

Assuming the motor 14 is controlled to be rotated to switch the latch mechanism from the half latched condition to the fully latched condition under the foregoing condition, each planetary gear 23 is rotated by the rotational torque inputted from the motor 14 to the sun gear body 20 via the rotational shaft 18. Because the ring gear body 21 is fixed against rotation, the planetary gears 23 rotate on their respective support shafts 31 while rotating around the sun gear portion 25 and the output shaft 15. Thus, the carrier 22 is rotated to output the decelerated rotational torque from the output shaft 15 to the input side of the latch operation mechanism. The latch operation mechanism rotates the latch to switch the latch mechanism in the half latched condition to the fully latched condition. Accordingly, the door is automatically fully closed by the door closer device.

If the door handle is operated to open the door when the motor 14 is controlled to switch the latch mechanism from the half latched condition to the fully latched condition, the engagement-disengagement operation member 36 is rotated against the biasing force of the torsion coil spring 37. As shown in FIGS. 1 and 6, the engagement portion 35 of the engagement-disengagement block 32 is engaged by the cam bore 41 of the cam portion 39 to retract the engagement-disengagement block 32 from the ring gear body 21 in the radial direction so that the tooth-shaped engagement portion 34 is disengaged from the outer gear portion 27 of the ring gear body 21. Accordingly, the ring gear body 21 is released and is able to rotate to interrupt the power transmission between the motor 14 and the output shaft 15.

When the rotational torque from the motor 14 is inputted to the sun gear body 20 under the foregoing condition, because the load on the output shaft 15 side is large (i.e., because the ring gear body 21 is rotatable, the output shaft 15 connected with the carrier 22 includes the resistance which is larger than the force for rotating the ring gear), the rotational torque transmitted from the sun gear 20 to the planetary gears 23 only rotates the ring gear body 21. The planetary gears 23 thus do not rotate around the output shaft 15. Consequently, the carrier 22 is not rotated and the rotational torque of the motor 14 is not transmitted from the output shaft 15 to the latch operation mechanism.

Moreover, because the reduction gear ratio from the latch operation mechanism to each planetary gear 23 is not so large, the output shaft 15 and accordingly the carrier 22 are rotated in the reverse direction by a smaller external force such as a biasing force of a spring for biasing the latch and the reaction force of a weather strip for sealing the vehicle door at the fully closed condition which is inputted from the latch operation mechanism side to rotate each planetary gear 23 in the reverse direction around the output shaft 15. Thus, when the latch mechanism is operated to be released from the latched condition by the opening operation of the door handle, the latch which is about to be switched from the half latched condition to the fully latched condition is returned to the unlatched condition by the aforementioned external force(s). Simultaneously, the latch operation mechanism which is about to be switched from the half latched condition to the fully latched condition is returned until the latch is unlatched by the biasing force of the spring for biasing the latch.

When the motor 14 is controlled to switch the latch mechanism from the half latched condition to be the fully latched condition, power feed to the motor 14 may not occur due to a defect in the power line of the vehicle. Even in this case, when the door handle is operated to open the door, the power transmission condition between the motor 14 and the latch operation mechanism is interrupted by the planetary gear mechanism 16. The latch and the latch operation mechanism are thus operated from the latched condition to the unlatched condition by the biasing force of the spring and the reaction force of the weather strip.

In the motor device 10, the power transmission condition between the sun gear body 20, which is inputted with the rotational torque from the motor 14, and the carrier 22 is interrupted and the power transmission condition between the motor 14 and the output shaft 15 is interrupted. Thus, when the latch operation mechanism is under the condition switching the latch mechanism from the half latched condition to the fully latched condition, the latch mechanism can be operated to be returned to the condition before the operation so that the latch mechanism is returned to the unlatched condition. Accordingly, the latch operation mechanism for operating the latch mechanism by the rotational torque inputted from the motor 14 does not need to be provided with a mechanism for interrupting the power transmitting condition between the motor 14 and the latch mechanism. Thus, the structure of the latch operation mechanism can be simplified compared with the known link mechanism. Also, in the known door closer device, the cancel lever 78 is engaged with the passive lever 75 operated by the larger rotational torque outputted from the motor device 72 after being decelerated. The outputted rotational torque of the motor device 72 is decelerated in the transmitting condition and the larger rotational torque operates the cancel lever 78. Therefore, when the transmitting condition is interrupted by the rotation of the cancel lever, a larger operational force is required fro rotating the cancel lever 78. In contrast, with the embodiment of the door closer device described here, the connection interrupting mechanism 17 is disposed in the power transmitting mechanism 16 and the rotational torque applied to the connection interrupting mechanism 17 is not so large. Thus, the power transmission condition of the door closer device described here can be interrupted with a smaller operational force.

In the known door closer device, the passive lever 75, the cancel lever 78 and the connecting lever 79 are required to have sufficient thickness and appropriate configuration to resist the larger rotational torque. However, in the door closer device described here, the passive lever 75, the cancel lever 78 and the connecting lever 79 are no longer required and so the size and weight of the overall door closer device can be reduced.

As described above, the driving force is transmitted between the motor 14 and the output shaft 15 by fixing the ring gear body 21 of the planetary gear mechanism 16 so that the ring gear body 21 does not rotate. The power transmission condition is interrupted by releasing the fixed condition of the ring gear body 21 of the planetary gear mechanism 16 so that the ring gear body 21 can rotate. Because the power transmission condition between the motor 14 and the output shaft 15 can be interrupted by releasing the fixed ring gear body 21 so that the ring gear body 21 can rotate, the interruption of the power transmission condition can be performed with a relatively simple structure.

The rotational torque of the motor 14 is inputted to the sun gear body 20 to be outputted from the output shaft 15 which is formed as one unit with the carrier 22. The rotational torque is transmitted to the output shaft 15 by virtue of the ring gear body 21 being fixed against rotation. Thus, when the driving force is transmitted between the motor 14 and the output shaft 15, the rotation of the motor 14 is reduced to output a larger torque. Thus, the latch operation mechanism and the latch mechanism which is applied with the larger load for switching the latch mechanism from the half latched condition to the fully latched condition can be operated with a motor 14 which is relatively small in size. This enables the overall size of the door closer device to be reduced.

The ring gear body 21 is fixed so as not to be rotated by engaging the engagement disengagement block 32 with the outer gear portion 27 of the ring gear body 21. The engagement operation mechanism 33 is operated by the opening operation of the door handle to permit rotation of the ring gear body 21 by the retraction of the engagement-disengagement block 32 from the position in which it is engaged with the outer gear portion 27, thus disengaging the engagement-disengagement block 32 from the outer gear portion 27. Thus, with a relatively simple mechanism, the ring gear body 21 can be fixed against rotation (i.e., non-rotatable) and can be released from the fixed condition to be rotated.

When the tooth-shaped engagement portion 34 of the engagement-disengagement lock 32 moving in the radial direction of the rotation axis of the ring gear body 21 is engaged with the outer gear portion 27 provided along the entire outer peripheral surface of the ring gear body 21, the ring gear body 21 is fixed so as not to be rotatable. When the engagement-disengagement block 32 is retracted from the ring gear body 21 in the radial direction, the tooth shaped engagement portion 34 is disengaged from the outer gear portion 27 to rotate the ring gear body 21. Accordingly, the engagement-disengagement block 32 is securely engaged with the ring gear body 21 with a relatively simple mechanism to securely fix the ring gear body 21 so as not to be rotated.

The engagement-disengagement block 32 engageable with the outer gear portion 27 of the ring gear body 21 is operated to be moved in the radial direction by the cam portion 39 of the engagement-disengagement operation member 36 which is operated by the opening operation of the door handle. Thus, the engagement-disengagement block 32 can be moved in the radial direction with a relatively simple structure to fix the ring gear body 21 in a non-rotatable state and can be released from the fixed condition to be rotated.

The engagement-disengagement operation member 36 is provided with the cam portion 39 as described above. However, instead of providing the engagement-disengagement operation member 36, the engagement-disengagement block 32 may be maintained at the position in which it is engaged with the ring gear body 21 by a compression coil spring. By pulling a wire connected to the engagement-disengagement block 32, the engagement-disengagement block 32 can be moved in the radial direction by the opening operation of the door handle for being retracted to a position disengaged from the ring gear body 21.

Although the outer gear portion 27 is described and illustrated as being provided on the outer periphery of the ring gear body 21, an alternative to the outer gear portion 27 can be utilized to fix the ring gear body 21 against rotation. One alternative involves providing multiple bores along the outer periphery of the ring gear body 21. By fitting one of a multiple number of pins provided on the engagement-disengagement block side into one of the bores, the ring gear body 21 can be fixed against rotation (i.e., the ring gear body 21 can be made non-rotatable).

As described above and illustrated in the drawing figures, the sun gear is pivoted or rotatable relative to the output shaft 15. The sun gear corresponds to a motor shaft, the carrier corresponds to an output shaft and the ring gear corresponds to a fixed shaft. This arrangement can be varied so that the sun gear, the carrier and the ring gear are any of the output shaft, the motor shaft and the fixed shaft. For example, the sun gear may be outfitted to be fixed to the output shaft 15 and the worm wheel may be provided with the carrier 22 as one unit. The carrier 22 can thus correspond to the input element or motor shaft, the sun gear can correspond to the outputting element or output shaft, and the ring gear can correspond to the fixed element or the fixed shaft, with the rotational torque inputted to the carrier from the motor 14 being outputted from the output shaft 15 rotating as one unit with the sun gear via the ring gear. In this case, the speed of the rotational torque of the motor 14 is increased thus to be outputted with further smaller torque.

As an alternative to the construction described above, the ring gear as an output element may be provided to be rotated as one unit with the output shaft. The carrier is fixed so as not to be rotated and is released from the fixed condition to be rotated. Accordingly, the driving force is transmitted between the sun gear corresponding to the input element and the ring gear and also the power transmission condition is interrupted. In this case, the speed of the rotation of the motor 14 is reduced to output further larger torque.

Although the connecting interruption mechanism described above is operated in accordance with the opening operation of the door handle, the connection interrupting mechanism may be operated by an actuator operated in accordance with a switch operation performed by the driver irrespective of the opening operation of the door handle.

In addition, the power transmitting mechanism may be replaced with a reduction gear mechanism constructed by engaging spur gears in which a large diameter spur gear and a small diameter spur gear are included as one unit and are geared in order. In this case, the power transmitting condition between the input and the output side can be interrupted by removing one of the spur gears from a train of gears.

The door closer device described above and illustrated in the drawing figures may be used for closing the front or rear doors of the vehicle, a sliding door, a back door, and/or a luggage door.

The door closer device may operate the latch mechanism to be moved to the unlatched condition when the latch mechanism is under the fully latched condition and may have a mechanism for automatically opening the door.

Although the door closer device is described above as being applied as a motor device for actuating the vehicle door operation device, the door closer device may be replaced with a door release device for performing the latched condition by operating the latch mechanism.

In accordance with the motor device for actuation of the vehicle door operation device described above, the power transmitting mechanism corresponds to the reduction gear mechanism. According to the foregoing construction, the latch operation mechanism and the latch mechanism applied with a large load in accordance with the operation can be operated by a further smaller electric motor.

In addition, it is no longer necessary to provide a mechanism for interrupting the driving transmission condition between the electric motor and the latch operation mechanism to the latch operation mechanism for operating the latch mechanism operated by the rotational torque inputted from the electric motor, thus to simplify the construction of the latch operation mechanism. The size and the weight of the door closer device can be reduced.

As described above, the rotational torque of the electric motor is outputted from the output shaft via the power transmitting mechanism. When the connection interrupting means interrupts the power transmission condition between the electric motor and the output shaft, the output shaft body becomes under the operable condition irrespective of the electric motor. Thus, the output shaft can be rotated by the external force which is reversely inputted.

The rotational torque of the electric motor inputted to the input element formed by the sun gear, the ring gear, and the carrier which are constructed as a planetary gear mechanism is outputted from the output shaft body rotating as one unit with the output element rotating via the fixed element which is fixed so as not to be rotated. When the connection interrupting means releases the fixed element so that the rotatable element is capable of rotating, the driving force cannot be transmitted between the input element and the output element, thereby interrupting the power transmitting condition between the electric motor and the output shaft body. Thus, the driving force can be transmitted between the electric motor and the output shaft body and can be interrupted by fixing one of elements rotating in the planetary gear mechanism so as not to be rotatable or by releasing one of the elements rotating in the planetary gear mechanism so as to be rotatable. The switching of the power transmission condition can thus be preformed with a simple construction.

The rotational torque of the electric motor inputted to the sun gear is transmitted to the planetary gear rotating on the support shaft and rotating around the output shaft via the fixed ring gear not to be rotated to be outputted from the carrier rotated by the planetary gear. When the connection interrupting means releases the ring gear so that the ring gear is rotatable, the power transmission condition between the sun gear and the carrier is interrupted to interrupt the power transmission condition between the electric motor and the output shaft. Thus, when the power transmission condition between the sun gear and the carrier is not interrupted, the rotational speed of the electric motor is reduced to output a further larger torque. Accordingly, the latch operation mechanism and the latch mechanism applied with the larger load in accordance with the operation can be operated by a smaller electric motor.

As described above, the engagement-disengagement member maintained by the engagement operation means is fixed so as not to be rotatable by being engaged with the engagement portion provided on the fixed element. By retracting the engagement-disengagement member from the position in which it is engaged with the engagement portion by the engagement operation means operated by the operation means, the fixed element can be rotated. Accordingly, the rotation of the fixed element can be prohibited or allowed with a relatively simple mechanism.

In addition, the fixed element is fixed against rotation by engaging the tooth shaped engagement portion of the engagement-disengagement member which is movable in the radial direction with the geared portion provided along the entire periphery of the fixed element. By separating the engagement-disengagement member from the engagement portion in the radial direction, the engagement condition is released to make the fixed element rotatable. Accordingly, the rotation of the fixed element can be securely prohibited with a relatively simple construction.

As also described above, the fixed element is fixed against rotation by engaging the tooth-shaped engagement portion of the fixed element with the geared engagement portion through movement of the engagement-disengagement member in the radial direction by the cam member supported and biased by the biasing means. The tooth-shaped engagement portion is disengaged from the geared engagement portion by operating the cam member by the operation means and by separating the engagement-disengagement member from the fixed element in the radial direction against the biasing force of the biasing element to make the fixed element become rotatable. Thus, the engagement-disengagement member is moved in the radial direction, the fixed element is fixed against rotation and is released from the fixed position to be rotated using relatively simple mechanisms When the power transmission condition between the electric motor and the output shaft body is interrupted in the motor device, the driving force is not transmitted between the electric motor and the latch mechanism even if the latch operation mechanism is engaged with the latch mechanism. Thus, the latched condition can be switched to the unlatched condition by operating the latch mechanism irrespective of the operation condition of the electric motor. Accordingly, even when the electric motor is controlled to operate the vehicle door from the partially open condition to the fully closed condition or when the electric motor controlled for closing the vehicle door from the partially open condition to be fully closed is stopped, the vehicle door can be opened.

The principles, preferred embodiments and modes of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims be embraced thereby.

What is claimed is:

1. A motor device for actuating a vehicle door operation device comprising:

an output shaft body for outputting a rotational torque of an electric motor;

a power transmitting mechanism for transmitting the rotational torque from the electric motor to the output shaft body;

connection interrupting means for interrupting a power transmission condition between the electric motor and the output shaft body;

the power transmitting mechanism comprising a planetary gear mechanism which includes a rotatable sun gear, a rotatable ring gear, a rotatable carrier and rotatable planetary gears, the ring gear being rotatable on a common rotation axis with the sun gear, the carrier being rotatable on a common rotation axis with the sun gear, the planetary gears being supported by the carrier and being geared with the sun gear and the ring gear, the rotational torque of the electric motor being inputted to an input element formed by a first one of the sun gear, the ring gear and the carrier, and the output shaft body being rotatable as one unit with an output element formed by a second one of the sun gear, the ring gear and the carrier, and the connection interrupting means transmitting the rotational torque of the electric motor to the output shaft body by fixing a fixed element formed by a third one of the sun gear, the ring gear and the carrier, the connection interrupting means interrupting the power transmission condition by releasing the fixed condition of the fixed element so that the fixed element is rotatable;

the connection interrupting means comprising:

an engagement portion provided on the fixed element;

an engagement-disengagement member engageable with the engagement portion for fixing the fixed element against rotation and disengageable from the engagement portion for permitting rotation of the fixed element; and engagement operation means for maintaining the engagement-disengagement member at a position in engagement with the engagement portion and for retracting the engagement-disengagement member from engagement with the engagement portion upon operation of a manual door opening operation to interrupt the power transmission condition between the input shaft body and the output shaft body; and wherein the engagement portion includes a geared engagement portion provided along the entire outer peripheral surface of the fixed element and the engagement-disengagement member is movably supported in a radial direction relative to the rotation axis of the fixed element, the engagement-disengagement member including a tooth-shaped engagement portion arranged in a radial direction relative to the geared engagement portion and being engageable with and disengageable from the geared engagement portion.

2. The motor device for actuating a vehicle door operation device according to claim 1, wherein the input element is the sun gear, the output element is the carrier, and the fixed element is the ring gear, and the connection interrupting means being adapted to alternately fix the ring gear so that the ring gear is not rotatable and release the ring gear to be rotatable.

3. The motor device for actuating a vehicle door operation device according to claim 1, wherein the engagement operation means comprises:

a shaft body rotatably operated by the operation means;

a cam member supported by the shaft body;

biasing means for biasing the cam member;

the cam member being positioned such that the tooth-shaped engagement portion is engaged with the geared engagement portion of the fixed element by contacting the engagement-disengagement member and is retractable from the position that the tooth-shaped engagement portion is engaged with the geared engagement portion by moving the engagement-disengagement member in the radial direction through rotation of the shaft body; and the biasing means biasing the engagement-disengagement member in the radial direction via the cam member and maintaining the tooth-shaped engagement portion in engagement with the geared engagement portion.

4. A motor device for actuating a vehicle door operation device comprising:

an output shaft body for outputting a rotational torque of an electric motor;

a power transmitting mechanism for transmitting the rotational torque from the electric motor to the output shaft body;

connection interrupting means for interrupting a power transmission condition between the electric motor and the output shaft body;

a latch mechanism operable between a half latched condition and a fully latched condition;

a latch operation mechanism operatively engaged with the latch mechanism for operating the latch mechanism between the half latched condition and the fully latched condition;

the rotational torque of the motor being transmitted to the latch operation mechanism to operate the latch mechanism from the half latched condition to the fully latched condition;

the power transmitting mechanism comprising a planetary gear mechanism including a rotatable sun gear, a rotatable ring gear, a rotatable carrier and rotatable planetary gears, the ring gear being rotatable on a common rotation axis with the sun gear, the carrier being rotatable on a common rotation axis with the sun gear, the planetary gears being supported by the carrier and being geared with the sun gear and the ring gear, the rotational torque of the electric motor being inputted to an input element formed by a first one of the sun gear, the ring gear and the carrier, and the output shaft body being rotatable as one unit with an output element formed by a second one of the sun gear, the ring gear and the carrier, and the connection interrupting means transmitting the rotational torque of the electric motor to the output shaft body by fixing a fixed element formed by a third one of the sun gear, the ring gear and the carrier, the connection interrupting means interrupting the power transmission condition by releasing the fixed condition of the fixed element so that the fixed element is rotatable;

the connection interrupting means comprising:

an engagement portion provided on the fixed element;

an engagement-disengagement member engageable with the engagement portion for fixing the fixed element against rotation and disengageable from the engagement portion for permitting rotation of the fixed element; and engagement operation means for maintaining the engagement-disengagement member at a position in engagement with the engagement portion and for retracting the engagement-disengagement member from engagement with the engagement portion upon operation of a manual door opening operation to interrupt the power transmission condition between the input shaft body and the output shaft body; and wherein the engagement portion includes a geared engagement portion provided along the entire outer peripheral surface of the fixed element and the engagement-disengagement member is movably supported in a radial direction relative to the rotation axis of the fixed element, the engagement-disengagement member including a tooth-shaped engagement portion arranged in a radial direction relative to the geared engagement portion and being engageable with and disengageable from the geared engagement portion.

5. The motor device for actuating a vehicle door operation device according to claim 4, wherein the input element is the sun gear, the output element is the carrier, and the fixed element is the ring gear, and the connection interrupting means being adapted to alternately fix the ring gear so that the ring gear is not rotatable and release the ring gear to be rotatable.

6. A motor device for actuating a vehicle door operation device according to claim 4, wherein the engagement operation means comprises:

a shaft body rotatably operated by the operation means;

a cam member supported by the shaft body;

biasing means for biasing the cam member;

the cam member being positioned such that the tooth-shaped engagement portion is engaged with the geared engagement portion of the fixed element by contacting the engagement-disengagement member and is retractable from the position that the tooth-shaped engagement portion is engaged with the geared engagement portion by moving the engagement-disengagement member in the radial direction through rotation of the shaft body; and the biasing means biasing the engagement-disengagement member in the radial direction via the cam member and maintaining the tooth-shaped engagement portion in engagement with the geared engagement portion.

7. A device for actuating vehicle door operation comprising:

a motor which produces rotational torque;

an output shaft operatively connected to a latch operation mechanism for effecting operation of a latch;

a plurality of gears forming a planetary gear mechanism operatively associated with the motor for transmitting the rotational torque produced by the motor to the output shaft; and an engagement-disengagement block movable into engagement with one of the gears forming a part of the planetary gear mechanism to fix the one gear against rotation whereupon the rotational torque of the motor is transmitted to the output shaft to operate the latch operation mechanism and movable out of engagement with the one gear forming a part of the planetary gear mechanism to permit rotation of the one gear whereupon the rotational torque of the motor is not transmitted to the output shaft;

wherein the one gear is a ring gear rotatable about a rotation axis and provided with a geared engagement portion along its outer periphery, the entire engagement-disengagement block being movably supported in a radial direction relative to the rotation axis of the ring gear and including a tooth-shaped engagement portion engageable with and disengageable from the geared engagement portion of the ring gear.

8. The device for actuating vehicle door operation according to claim 7, wherein the planetary gear mechanism includes a rotatable ring gear constituting the one gear, a rotatable sun gear, a rotatable carrier, and a plurality of rotatable planetary gears supported on the carrier and geared with the sun gear and the ring gear.

9. The device for actuating vehicle door operation according to claim 8, wherein the ring gear is rotatable on a common rotation axis with the sun gear, and the carrier is rotatable on a common rotation axis with the sun gear.

10. The device for actuating vehicle door operation according to claim 7, including engagement operation means for maintaining the engagement-disengagement block in engagement with the one gear and for moving the engagement-disengagement block out of engagement with the one gear upon operation of a door handle.

11. The device for actuating vehicle door operation according to claim 7, including a cam member supported by a shaft and provided with a projection, the engagement-disengagement block being adapted to be contacted by the projection on the cam member to move the engagement-disengagement block into engagement with the one gear, and a spring which biases the cam member in a direction causing the projection on the cam member to contact the engagement-disengagement block and move the engagement-disengagement block into engagement with the one gear.

12. The device for actuating vehicle door operation according to claim 11, wherein the engagement-disengagement block includes a pin engagement portion positioned in an arcuate slot formed in the cam member.

13. The device for actuating vehicle door operation according to claim 7, wherein the motor is housed in a housing, the engagement-disengagement block being slidably disposed at a portion of the housing to slidably move radially inwardly toward the ring gear to effect engagement of the tooth-shaped engagement portion with the geared engagement portion of the ring gear and to slidably move radially outwardly away from the ring gear to effect disengagement of the tooth-shaped engagement portion from the geared engagement portion of the ring gear.

* * * * *